Figure 1:
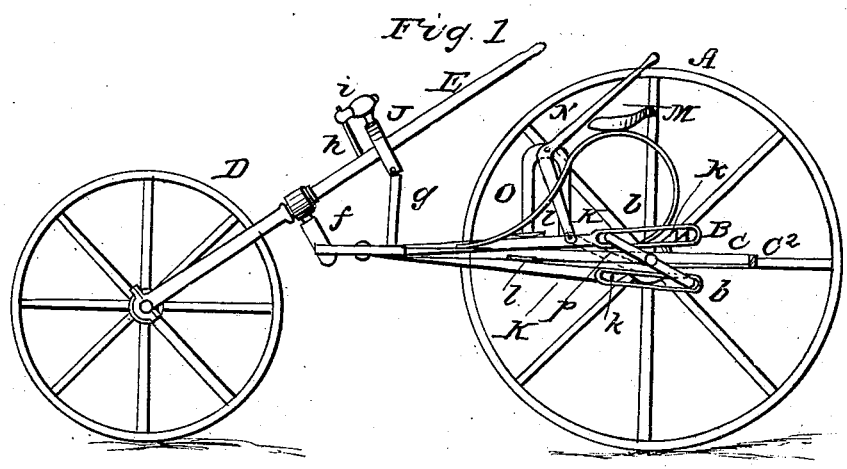
Figure 2:
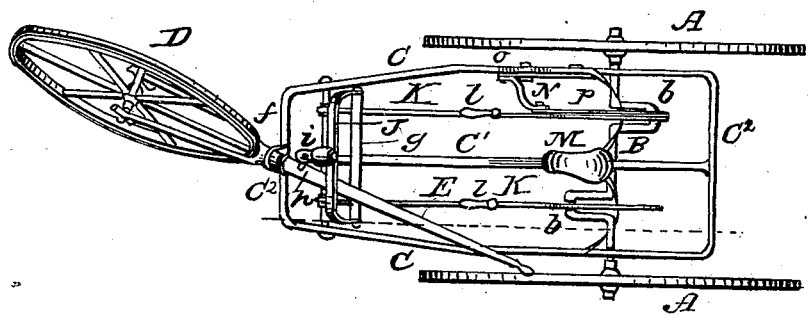

J. GUILD.
Velocipede.

No. 90,837.

Patented June 1, 1869.

Witnesses
Jno. J. Bonner
J. H. Becker

Inventor
Joseph Guild
by Forbush & Hyatt
attys

United States Patent Office.

JOSEPH GUILD, OF BUFFALO, NEW YORK.

*Letters Patent No. 90,837, dated June 1, 1869.*

IMPROVEMENT IN VELOCIPEDE.

The Schedule referred to in these Letters Patent and making part of the same.

*To all whom it may concern:*

Be it known that I, JOSEPH GUILD, of the city of Buffalo, in the county of Erie, and State of New York, have invented certain new and useful Improvements in Velocipedes; and I do hereby declare that the following is a full and exact description thereof, reference being had to the accompanying drawings, making part of this specification.

My invention relates to what is termed a tricycle, or three-wheeled velocipede; and It consists—

First, in the combination and arrangement of two pedal-levers, with the double-cranked axle of the rear wheels, one end of the said levers being hinged to the front of the frame, and the other connecting with the cranks, which work in the slotted ends thereof.

Second, of a steering-lever, which is so pivoted to the front end of the frame as to have a rolling motion at the same time it is moved laterally, whereby the wheel, mounted in the bifurcated end thereof, is tipped or inclined from a perpendicular, as well as twisted to one side, in turning the vehicle.

In the drawings above referred to—

Figure I represents a longitudinal vertical section through the frame of the vehicle.

Figure II is a plan thereof.

Like letters of reference designate like parts in each of the figures.

A A indicate the two rear wheels, rigidly mounted on an axle B, formed with two cranks, $b\ b$.

C are two side-pieces;

$C^1$, a central longitudinal piece; and $C^2\ C^2$, two end-pieces, forming a rectangular frame, which is supported at the rear by the axle B.

D is the forward and steering-wheel, mounted in the bifurcated end of a lever, E.

This lever is inclined and pivoted to the front end of the frame, by means of an eye-bolt, $f$, the eye being widened so as to form a collar-bearing, through which the lever passes, while the bolt passes downward through the frame, and is secured, by a nut, beneath.

A little back of this pivot, a horizontal rest, $g$, is supported, by suitable standards or braces, above the frame, on which the lever rests, and slides back and forth in steering the vehicle.

From the upper side of the lever, a short rod, $h$, extends upward, and passes through the eye of a pivot-bearing, $i$, supported at the top of a bent frame, J, pivoted, at each end, to the ends of the rest $g$.

Moving the lever to one side or the other, while the rod $h$ is retained in its pivot-bearing $i$, causes the lever to partially turn in the eye or sleeve of the pivot $f$, which tips or inclines the steering-wheel in a corresponding manner.

K K are two pedal-levers, hinged to the front end of the frame, and extending backward on either side of the centre-piece $C^1$, so as to connect with the cranks $b\ b$, which work in slots $k$ in the ends thereof.

M is a seat, supported above the frame in any suitable manner.

N is a bent lever, pivoted to a standard, $o$, at one side of the frame, and $p$, a short pitman, connecting this lever with one of the cranks $b$.

This lever is so arranged that its dead-points will come intermediate those of the pedals.

My improved velocipede, thus constructed, is propelled by the rider operating the pedals, suitable foot-holds $l$, being attached thereto for the purpose; or it may be driven by means of the hand-lever alone, or by both lever and pedals, or by a single pedal, the disengaged hand steering the vehicle by means of the lever E.

It will thus be readily perceived that my improved vehicle is especially adapted for the use of cripples, as it can be propelled by a single arm or leg, as occasion may require, or by each alternately.

The combination of the lever and pedals enables the vehicle to be propelled with the greatest ease, as the power, required for the purpose, can be exerted equally by hands and feet, or in that proportion most agreeable and least tiresome to the rider.

The seat should be so arranged that the weight of the rider will be mostly supported by the rear axle, the pressure of the steering-lever on the rest $g$ being only sufficient to insure the maintenance of the equilibrium of the vehicle.

My improved manner of mounting the forward wheel and tiller, enables the vehicle to be easily steered, and to make more sudden turns than it otherwise could, while the tipping of the forward wheel relieves it, in a great measure, from the strain to which it is subjected from the momentum of the vehicle in turning.

What I claim as my invention, is—

1. The slotted pedals K K, cranks $b$, bent lever N, and pitman $p$, all arranged and combined as herein described.

2. Hinging the bifurcated lever E to the frame C, by the eye-bolt $f$, in combination with the rest $g$, turning-rod $h$, and bearing $i$, so that a lateral movement of the lever will cause it to turn on its axis and tip the steering-wheel D, as and for the purpose set forth.

JOSEPH GUILD.

Witnesses:
JNO. J. BONNER,
V. H. BECKER.